US006550681B1

(12) United States Patent
Ross et al.

(10) Patent No.: US 6,550,681 B1
(45) Date of Patent: Apr. 22, 2003

(54) INTERNET RELATED APPLIANCES

(75) Inventors: John Anderson Fergus Ross, Del Mar, CA (US); Kirby Gannett Vosburgh, Niskayuna, NY (US); Jerome Johnson Tiemann, Schenectady, NY (US); Kristina Helena Valborg Hedengren, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/497,355

(22) Filed: Feb. 3, 2000

Related U.S. Application Data

(60) Provisional application No. 60/120,607, filed on Feb. 18, 1999.

(51) Int. Cl.[7] .......................... G06K 7/10; G06K 15/00

(52) U.S. Cl. ................. 235/462.13; 235/494; 235/470; 235/462.15; 219/714; 219/702; 219/506

(58) Field of Search ...................... 235/462.13, 462.15, 235/494, 470, 473, 472.01; 219/714, 10.55 B, 702, 506, 720; 700/15

(56) References Cited

U.S. PATENT DOCUMENTS

| | | | | | |
|---|---|---|---|---|---|
| 3,500,742 | A | | 3/1970 | Tanguy et al. | |
| 4,323,773 | A | * | 4/1982 | Carpenter | 219/714 |
| 4,345,132 | A | | 8/1982 | Takase et al. | |
| RE31,833 | E | | 2/1985 | Loeffler et al. | |
| 4,780,588 | A | | 10/1988 | Edamura | |
| 4,812,963 | A | | 3/1989 | Albrecht et al. | |
| 4,816,635 | A | * | 3/1989 | Edamura | 219/489 |
| 4,835,372 | A | | 5/1989 | Gombrich et al. | |
| 4,837,414 | A | | 6/1989 | Edamula | |
| 4,945,216 | A | | 7/1990 | Tanabe et al. | |
| 5,011,042 | A | | 4/1991 | Bunce et al. | |
| 5,147,068 | A | | 9/1992 | Wright | |
| 5,233,520 | A | | 8/1993 | Kretsch et al. | |
| 5,267,309 | A | * | 11/1993 | Sanders et al. | 370/359 |
| 5,274,209 | A | | 12/1993 | Edamura | |
| 5,285,041 | A | | 2/1994 | Wright | |
| 5,309,566 | A | * | 5/1994 | Larson | 710/67 |
| 5,321,232 | A | | 6/1994 | Ogle | |
| 5,378,874 | A | | 1/1995 | Holling et al. | |
| 5,389,764 | A | | 2/1995 | Nishii et al. | |
| 5,426,280 | A | | 6/1995 | Smith | |
| 5,478,989 | A | | 12/1995 | Shepley | |
| 5,504,311 | A | | 4/1996 | DuBuis et al. | |
| 5,553,123 | A | | 9/1996 | Chan et al. | |
| 5,573,691 | A | | 11/1996 | Yoshida et al. | |
| 5,611,327 | A | | 3/1997 | Filho et al. | |
| 5,688,423 | A | | 11/1997 | Rudewicz et al. | |
| 5,700,998 | A | | 12/1997 | Palti | |
| 5,724,244 | A | | 3/1998 | Yabuki | |
| 5,804,803 | A | | 9/1998 | Cragun et al. | |
| 5,812,393 | A | | 9/1998 | Drucker | |
| 5,819,735 | A | | 10/1998 | Mansfield et al. | |
| 5,841,115 | A | | 11/1998 | Shepley | |
| 6,121,593 | A | * | 9/2000 | Mansbery et al. | 219/679 |
| 6,124,583 | A | * | 9/2000 | Bowers | 219/702 |
| 6,137,095 | A | * | 10/2000 | Kashimoto et al. | 219/678 |
| 6,198,975 | B1 | * | 3/2001 | Drucker et al. | 700/15 |
| 6,325,290 | B1 | * | 12/2001 | Walter et al. | 186/59 |
| 6,359,270 | B1 | * | 3/2002 | Bridson | 219/679 |
| 6,393,848 | B2 | * | 5/2002 | Roh et al. | 62/126 |
| 6,420,687 | B1 | * | 7/2002 | Ozawa et al. | 219/702 |
| 6,444,965 | B1 | * | 9/2002 | Ha et al. | 219/702 |
| 6,480,753 | B1 | * | 11/2002 | Calder et al. | 700/83 |

FOREIGN PATENT DOCUMENTS

| | | | |
|---|---|---|---|
| JP | 406137562 A | * | 5/1994 |

* cited by examiner

*Primary Examiner*—Michael G. Lee
*Assistant Examiner*—Daniel Walsh
(74) *Attorney, Agent, or Firm*—Patrick K. Patnoded; Christian G. Cabou

(57) ABSTRACT

A cooking apparatus includes a scanning device for reading a tag disposed upon a cooking item, which tag includes cooking instructions, and a network connection for receiving updated information relative to a respective cooking item. Circuitry is coupled to the scanning device and to the network connection for updated and implementing the cooking instructions.

20 Claims, 3 Drawing Sheets

INTERNET RELATED APPLIANCES

This application claims priority of a provisional application entitled "Foodscan Containers," by Ross and Vosburgh, Ser. No. 60/120,607 filed Feb. 18, 1999, which Provisional Application is herein incorporated by reference.

BACKGROUND OF THE INVENTION

This invention relates generally to appliances and more specifically to Internet related appliances.

Most conventional appliances are controlled by knobs, buttons or similar type input devices by a system-user, typically a home owner. For example, in a conventional microwave oven, a system-user inserts food into the cooking chamber, selects the power level and the cooking time and presses start. Typically, the system user relies on the cooking instructions provided with the food product or within a cookbook. Although power levels vary from microwave to microwave cooking instructions typically do not adequately account for the variances. As the Internet becomes mainstream, more and more homes are being wired to take advantage of the "potential" of the Internet. For the most part, however, home appliances, like microwave ovens, have failed to tap into the advantages offered by the Internet.

Accordingly, there is a need in the art for Internet related appliances.

SUMMARY OF THE INVENTION

A cooking apparatus includes a scanning device for reading a tag disposed upon a cooking item, which tag includes cooking instructions, and a network connection for receiving updated information relative to a respective cooking item. Circuitry is coupled to the scanning device and to the network connection for updating and implementing the cooking instructions.

DETAILED DESCRIPTION OF THE INVENTION

Figure 1:
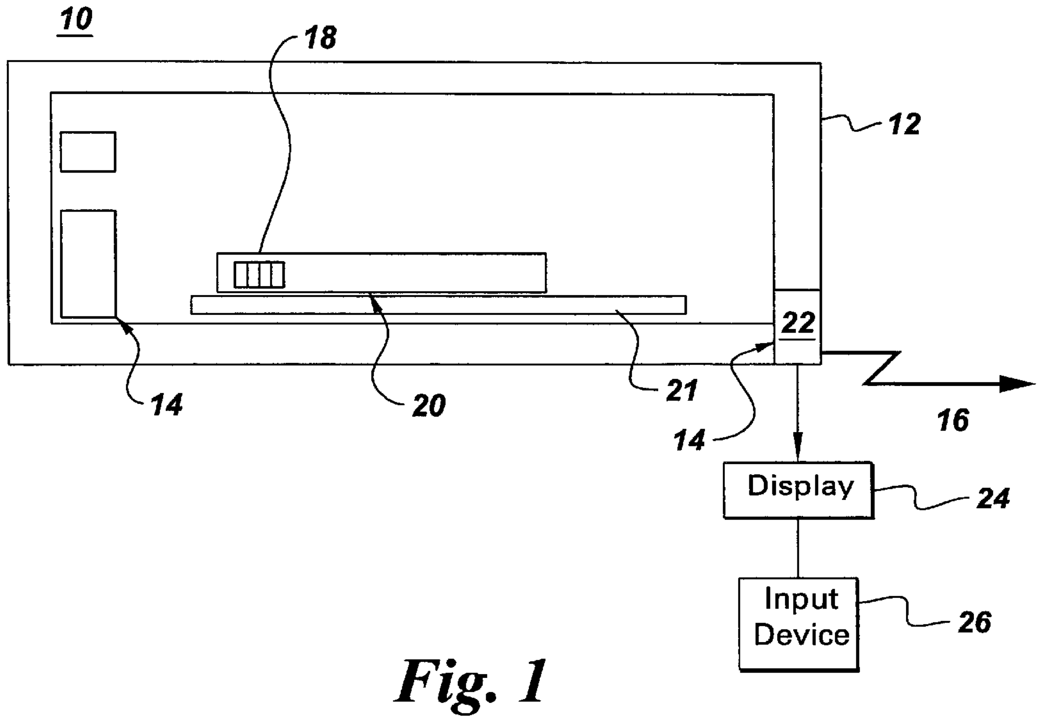
FIG. 1 is a schematic representation of one embodiment of the instant invention.

A cooking apparatus 10 typically includes a housing 12, a scanning device 14, and a network connection 16, as shown in FIG. 1.

Scanning device 14 is adapted to read a tag 18 disposed upon a cooking item 20, which tag 18 includes cooking instructions for cooking item 20. Network connection 16 is utilized to receive updated information related to a respective cooking item 20. Network connection 16 typically comprises an Internet connection. Cooking item 20 as used herein is defined as any food or liquid item, or food or liquid related housing that an identifying tag 18 may be placed upon.

Circuitry 22 is coupled to scanning device 14 and to network connection 16 for updating and implementing the cooking instructions and cooking the item 20 according to the cooking instructions. Scanning device 14 typically comprises a photodetector.

In one embodiment, cooking item 20 is a prepackaged cooking item. In another embodiment, cooking item 20 is a container for boiling a boilable product of a known quantity.

Circuitry 22 may include a translation table for matching a respective cooking item 20 to appropriate cooking instructions. In one embodiment, the translation table utilizes a combination of read only memory and random access memory. The read only memory is factory set with cooking instructions and the random access memory is updated via network connection 16. The random access memory may be updated for a variety of reasons including new product releases, corrections to cooking instructions, product recalls or allergy alerts. In one embodiment, the random access memory is non-volatile programmable memory.

Figure 2:
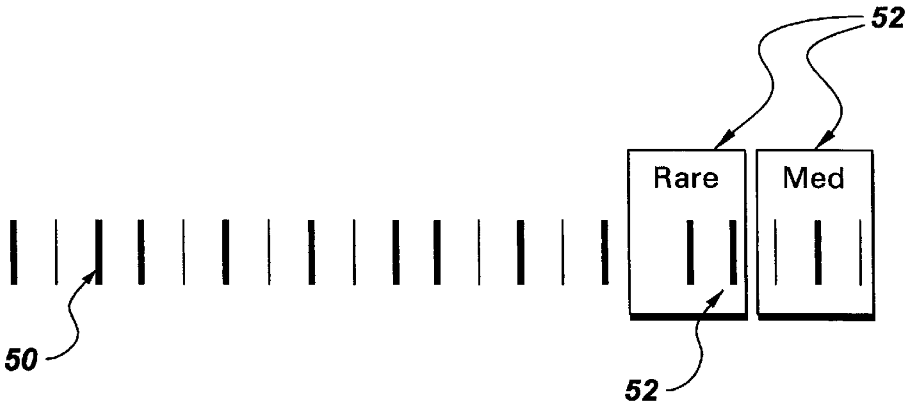
FIG. 2 is a schematic representation of another aspect of the instant invention.

Tag 18 may comprise a barcode 50 as shown in FIG. 2. In one embodiment, bar code 50 includes at least one user removable portion 52 to vary cooking instructions. User removable portion(s) 52 may comprise, for example, removable tape(s) that cover portions of barcode 50. In one embodiment, tag 18 (FIG. 1) comprises a UPC symbol that uniquely identifies cooking item 20.

Cooking apparatus 10 may further comprise a display 24 for displaying information about a respective cooking item 20. The information may include, for example, an ingredient list for a cooking item 20, where the ingredient list may be updated via network connection 16. Ingredients that often cause allergic reactions may be highlighted on display 24.

Cooking apparatus 10 may also further comprise an input device 26, for example a keyboard. Input device 26 may be utilized to pre-load a list of allergic ingredients to identify the presence of such allergic ingredients, possibly with a system alarm (not shown).

The preparation and labeling of food products is highly regulated. The primary ingredients of a prepared food product are listed on the label and material used in product preparations are regulated as well.

In one embodiment, cooking apparatus 10 reads tag 18, for example the UPC of a food product. Through access to a database typically over network connection 16, cooking apparatus 10 retrieves and displays the ingredients of a product, including ingredients not normally listed on the label.

Products like beer may contain ingredients, such as preservatives, not listed on the label. The ingredients are then displayed via display 24 for viewing by a product user and a decision about the suitability of the product.

Once the product ingredients are known, circuitry 22 may perform value added functions, for example, ingredients that often cause allergic reactions could be highlighted, a user could query specific allergic possibilities using input device 26, or the user could pre-load a list of possible allergic reactions and circuitry will identify possible dangers.

This will provide useful information to an individual who restricts their dietary intake of certain foods for religious or lifestyle reasons. Additionally, this embodiment could be used in conjunction with access to a medical database, typically over network connection 16 to provide information on possible interactions with medications.

This embodiment may provide supplemental dietary information. For example, the amount of sugar in an item might be of interest to a diabetic. If utilized with discipline, the daily consumption of food or sugar could be calculated by circuitry 22 and displayed on display 24.

This technique could also aid people who are trying to lose weight. The caloric intake or other metrics could be computed, displayed and tracked. This embodiment is not limited to the use of the UPC, but would apply to any unambiguous way to identify the food product. Additionally, while this embodiment is shown and discussed as implemented through cooking apparatus 10, aspects of this invention are not limited to use within cooking apparatus 10. In fact, many aspects of this invention may be utilized in many other forms including as stand alone information appliances.

As well as being useful in food preparation, this invention could be provided at the point of sale (in a supermarket, for example) to guide consumers to purchase products that are suitable for their needs.

As briefly discussed above, heating and cooking times of food depend on the appliance used to supply the heating energy. Processed food vendors typically give a range of heating times listed in their cooking directions as different cooking appliances have different heating characteristics. This requires a user to attend to the food while heating. Multiple steps such as defrost, bake and simmer, may be required, only adding to the guesswork. Additionally, a user may not wish to learn how to utilize programming features of modern appliances.

As discussed above, since the degree of doneness desired by the consumer is not always the same, the energy required to cook a package of food cannot be optimally determined from information encoded on its container. Furthermore, the customer may prefer rare (or al dente) or medium or well done.

In one embodiment of the invention as shown in FIG. 2, sections of mildly adhesive opaque tapes 52 (for easy removal) are labeled rare, medium and well done (or other appropriate choices), and cover portions of bar code 50 that are read by cooking appliance 10. When one or more of these tape sections 52 are removed, the bar code underneath is exposed, and the appropriate cooking instructions are ready and carried out. While this aspect of the invention is shown and discussed in regards to applications involving cooking items 20, bar code 50 may be utilized in many other applications in which value is added through allowing a user to alter bar codes and change the information transmitted.

Figure 3:
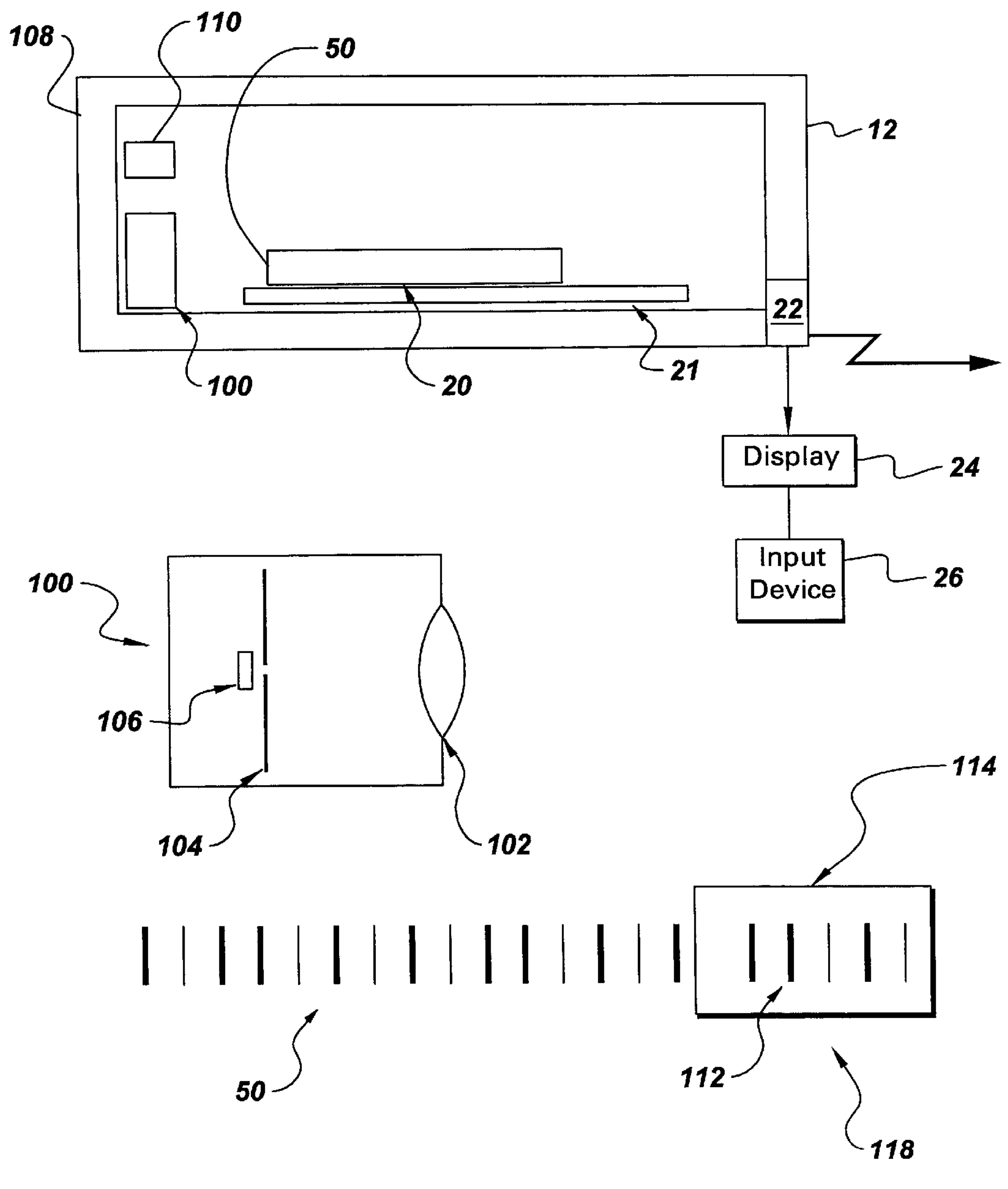
FIG. 3 is a schematic representation of another aspect of the instant invention.

In one embodiment, as shown in FIG. 3, a cooking item 20 is placed on a rotating circular carousel 21 with at least one side of cooking item 20 facing substantially parallel to and radially close to a tangent to carousel platform 21. (The left side of the package in the diagram.) Cooking item 20 typically includes a bar code 50 with vertical stripes containing cooking information preferably on all four sides, but at least on the side referred to above. An optical detector 100 typically includes a lens 102, a slit 104, and a photodiode 106 that reside within a wall 108 of cooking apparatus 10 in the region generally beneath an internal light bulb 110. These elements are shown as rectangles within cooking apparatus 10 in FIG. 3. As cooking item 20 revolves, optical detector 100, as a result of the motion of carousel 21, scans bar code 50. The information from scanned bar code 50 is transferred to circuitry 22 for receiving cooking instructions. In a region horizontally adjacent to bar code 50, an initially invisible bar code portion 112 is covered by an opaque fusible layer 114 that is in thermal contact with cooking item 20. When the temperature of cooking item 20 reaches a pre-determined value, fusible layer 114 becomes transparent as the granules that comprise fusible layer 114 fuse together, melt and drip downwards, or shrink and curl up when a specific temperature is reached. After cooking item 20 has reached this predetermined temperature, at least one additional bar of bar-coded information 112 becomes visible and readable by optical detector 100. If desired, more than one fusible material can be used that melt or retract at various temperatures. In this way, bar code portion can coincide with multiple temperatures that are reached. As an alternative, liquid crystal materials that change color or transparency at a specific temperature can be used to "uncover" additional bar code portions 112.

Figure 4:
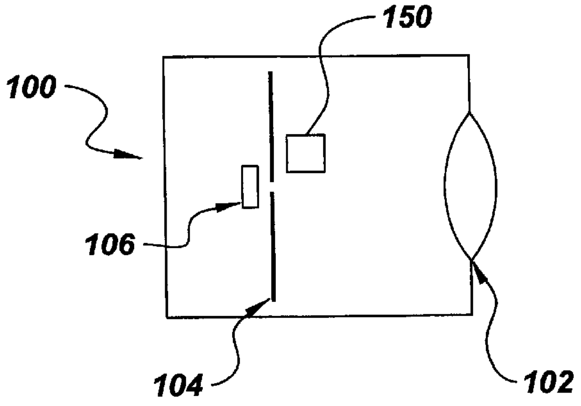
FIG. 4 is a schematic representation of another aspect of the instant invention.
Figure 5:
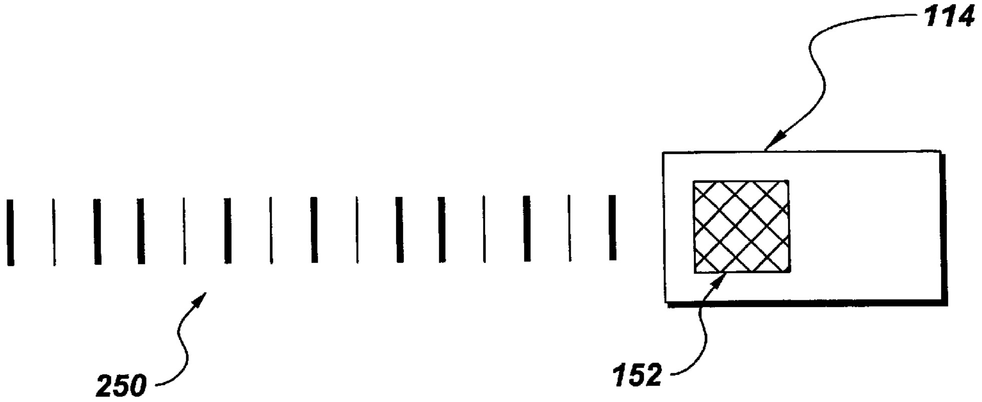
FIG. 5 is a schematic representation of another aspect of the instant invention.

In another embodiment, shown in FIGS. 4 & 5, an auxiliary low intensity light source 150 that is preferably modulated at a convenient relatively high frequency is placed adjacent to slit 102 in optical detector 100, and a retro-reflecting portion 152 is attached to cooking item 20 (FIG. 1) that is covered by a thermally activated cover 114 such as was described above. Because retro-reflecting portion 152 is much more efficient at returning light to a source than other reflectors, it is possible that the light returned by barcode 250 from light source 150 is completely negligible compared to the ambient reflected light while at the same time the light reflected by retro-reflecting portion 152 (when it is uncovered) provides a modulated signal that is much stronger than that returned from barcode 50. Thus, the change induced by retro-reflecting portion 152, when uncovered, can be sensed by the appearance of an ac component in the output by optical detector 100.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A cooking apparatus comprising: a scanning device for reading a tag disposed upon a cooking item, which tag includes cooking instructions; an Internet connection for receiving updated information related to a respective cooking item; and circuitry coupled to said scanning device and to said Internet connection for updating and implementing said cooking instructions and cooking said cooking item according to said cooking instructions; wherein said circuitry includes a translation table that utilizes a combination of read only memory and random access memory and said read only memory is factory set with cooking instructions and said random access memory is updated via said Internet connection.

2. A cooking apparatus in accordance with claim 1, wherein said tag is a barcode and said scanning device is a photodetector for reading said barcode.

3. A cooking apparatus in accordance with claim 1, wherein said cooking item is a prepackaged microwave food item.

4. A cooking apparatus in accordance with claim 1, wherein said cooking item is a container for boiling a boilable product of a known amount.

5. A cooking apparatus in accordance with claim 1, wherein said random access memory is updated because of new product releases, corrections to cooking instructions, product recalls or allergy alerts.

6. A cooking apparatus in accordance with claim 1, wherein said memory is non-volatile programmable memory.

7. A cooking apparatus in accordance with claim 2, wherein said barcode is a barcode having at least one user removable portion to vary cooing instructions.

8. A cooking apparatus in accordance with claim 7, wherein said user removal portions are removable tapes that cover portions of said barcode.

9. A cooking apparatus in accordance with claim 1, further comprising a display for displaying information about a respective cooking item.

10. A cooking apparatus in accordance with claim 9, wherein said information includes an ingredient list for a cooking item.

11. A cooking apparatus in accordance with claim 10, wherein said ingredient list is periodically updated via said network connection.

12. A cooking apparatus in accordance with claim 10, wherein ingredients that often cause allergic reactions are highlighted on said display.

13. A cooking apparatus in accordance with claim 10, further comprising an input device.

14. A cooking apparatus in accordance with claim 13, wherein said input device is used to pre-load a list of allergic ingredients and the cooking apparatus identifies the presence of said allergic ingredients.

15. A cooking apparatus comprising: a scanning device for reading a tag disposed upon a cooking item, which tag includes cooking instructions; an Internet connection for receiving updated information related to a respective cooking item; and circuitry coupled to said scanning device and to said Internet connection for updating and implementing said cooking instructions and cooking said cooking item according to said cooking instructions wherein said scanning device is a photodetector for reading a barcode and said barcode is a barcode having at least one user removable portion to vary cooking instructions.

16. A cooking apparatus in accordance with claim 15, wherein said user removal portions are removable tapes that cover portions of said barcode.

17. A cooking apparatus comprising: a scanning device for reading a tag disposed upon a cooking item, which tag includes cooking instructions; an Internet connection for receiving updated information related to a respective cooking item; and circuitry coupled to said scanning device and to said Internet connection for updating and implementing said cooking instructions and cooking said cooking item according to said cooking instructions further comprising a display for displaying information about a respective cooking item wherein said information includes an ingredient list for a cooking item wherein said ingredient list is periodically updated via said Internet connection.

18. A cooking apparatus in accordance with claim 17, wherein ingredients that often cause allergic reactions are highlighted on said display.

19. A cooking apparatus in accordance with claim 17, further comprising an input device.

20. A cooking apparatus in accordance with claim 19, wherein said input device is used to pre-load a list of allergic ingredients and the cooking apparatus identifies the presence of said allergic ingredients.

* * * * *